United States Patent
Bae

(10) Patent No.: US 9,588,615 B2
(45) Date of Patent: Mar. 7, 2017

(54) TOUCH AND GESTURE SENSING SYSTEM AND DRIVING METHOD THEREOF

(71) Applicant: LG DISPLAY CO., LTD., Seoul (KR)

(72) Inventor: Sanghyuck Bae, Paju-Si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/505,903

(22) Filed: Oct. 3, 2014

(65) Prior Publication Data
US 2015/0145819 A1 May 28, 2015

(30) Foreign Application Priority Data
Nov. 26, 2013 (KR) .................. 10-2013-0144506

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2012/0197196 A1* | 8/2012 | Halbert et al. ................. | 604/151 |
| 2013/0076675 A1 | 3/2013 | Shin et al. | |
| 2013/0162590 A1* | 6/2013 | Imai ........................ | G06F 3/044 345/174 |
| 2013/0201115 A1* | 8/2013 | Heubel ......................... | 345/173 |
| 2014/0232635 A1* | 8/2014 | Lee et al. ..................... | 345/156 |

* cited by examiner

*Primary Examiner* — David D Davis
(74) *Attorney, Agent, or Firm* — Brinks Gilson & Lione

(57) ABSTRACT

A touch and gesture sensing system and a driving method thereof are provided. The touch and gesture sensing system comprises: a display panel comprising a pixel array, sensors, and sensor lines connected to the sensors; a display driving circuit that writes a data voltage to the pixels of the pixel array during a display driving period; and a sensor driving circuit that applies a touch sensor driving signal to the sensors to sense touch input during a touch sensing period and applies a gesture sensor driving signal to the sensors to sense gesture input during a gesture sensing period.

15 Claims, 10 Drawing Sheets

TOUCH AND GESTURE SENSING SYSTEM AND DRIVING METHOD THEREOF

This application claims the benefit of priority to Korea Patent Application No. 10-2013-0144506 filed on Nov. 26, 2013, which is incorporated herein by reference for all purposes as if fully set forth herein.

BACKGROUND

Field

This document relates to a touch and gesture sensing system and a driving method thereof.

Related Art

A user interface (UI) is configured so that people (users) are able to communicate with various electric and electronic devices and thus can easily control the devices as desired. Examples of the user interfaces include a keypad, a keyboard, a mouse, an on-screen display (OSD), and a remote controller having an infrared communication function or a radio frequency (RF) communication function. User interface technologies have continuously evolved to increase user's sensibility and handling convenience. The user interface as developed includes a touch UI, voice recognition UI, 3D UI, etc. A gesture UI for gesture sensing has been recently used in home appliances.

The touch UI senses an object that is directly touching the touch screen or approaching it from a level similar to that of the touch screen. The touch UI senses touch input from the user or object by using a touch screen including resistive or capacitive touch sensors.

The gesture UI spatially senses a user gesture or object motion by using a camera or a motion sensor. A capacitive touch sensing system is able to sense a finger directly touching it or in close proximity to a touch sensor, but it is difficult for the capacitive touch sensing system to sense spatial input (or gesture input) based on user motion or object motion at a place far from the touch sensor. The touch UI and the gesture UI are implemented in different systems. Implementing the touch UI and the gesture UI in different systems leads to steep cost rises and increases hardware complexity.

By embedding touch sensors in a display panel in an in-cell manner, a single frame period is divided into a display driving period and a touch sensor driving period to prevent a pixel driving signal from affecting a touch sensor signal. Embedding touch sensors in a display panel makes it difficult to secure a gesture sensing period without affecting the pixel driving signal and the touch sensor driving signal. Larger display panel screens make it more difficult to secure the gesture sensing period because the display driving period and the touch sensor driving period within 1 frame period becomes longer.

SUMMARY

A touch and gesture sensing system comprises: a display panel comprising a pixel array, sensors, and sensor lines connected to the sensors; a display driving circuit that writes a data voltage to the pixels of the pixel array during a display driving period; and a sensor driving circuit that applies a touch sensor driving signal to the sensors to sense touch input during a touch sensing period and applies a gesture sensor driving signal to the sensors to sense gesture input during a gesture sensing period.

In another aspect a driving method of a touch and gesture sensing system comprises: writing a data voltage to pixels of a pixel array during a display driving period; applying a touch sensor driving signal to sensors to sense touch input during a touch sensing period; and applying a gesture sensor driving signal to the sensors to sense gesture input during a gesture sensing period.

The gesture sensing period is allocated in the remaining part of single frame period, except the display driving period and touch sensing period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Figure 1:
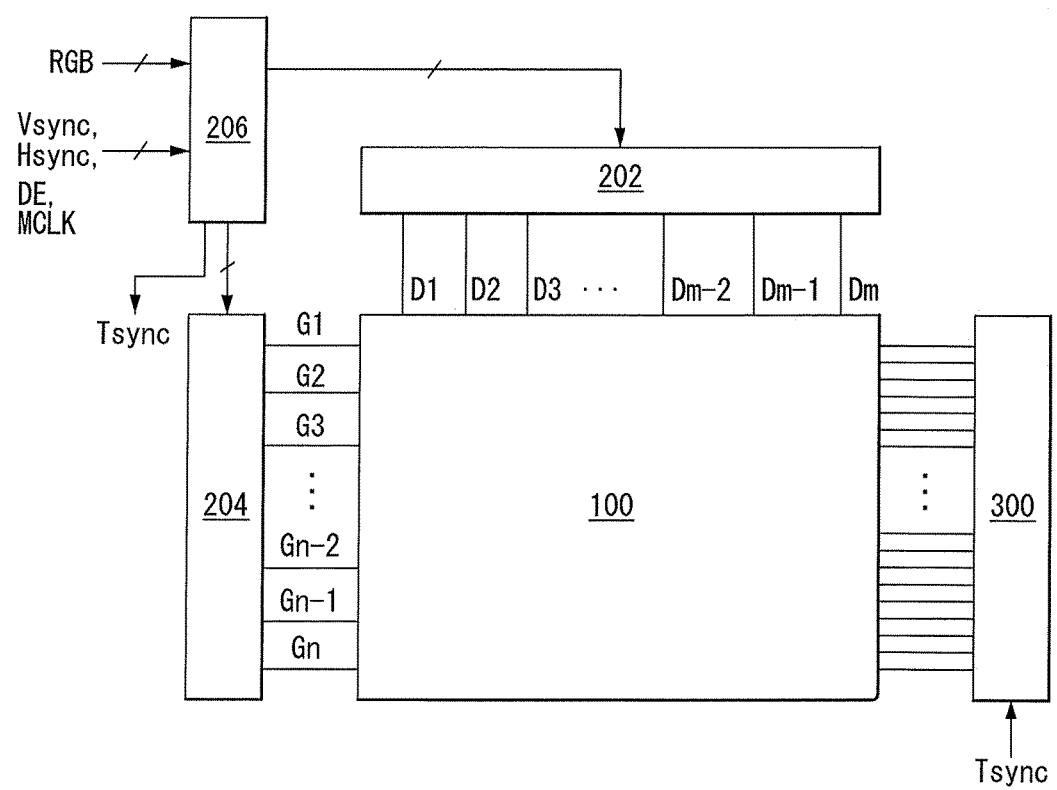
FIG. 1 is a block diagram showing a touch and gesture sensing system according to an exemplary embodiment of the present invention.

A display device may be implemented as a flat panel display such as a liquid crystal display (LCD), an organic light emitting diode display (OLED display), etc.

A touch and gesture sensing system of the present invention senses touch input and gesture input using capacitive sensors. The gesture input may be created by a user gesture.

Capacitive sensors may be implemented as self capacitance sensors or mutual capacitance sensors. The self capacitance sensors are connected to sensor lines formed along one direction on a one-to-one basis. The mutual capacitance sensors are formed at the crossings of two sensor lines orthogonal to each other with a dielectric layer interposed between them.

Hereinafter, exemplary embodiments of this document will be described in detail with reference to the attached drawings. Throughout the specification, like reference numerals denote substantially like components. In the following description, detailed descriptions of related known functions or elements that may unnecessarily make the gist of the present invention obscure will be omitted.

Figure 2:
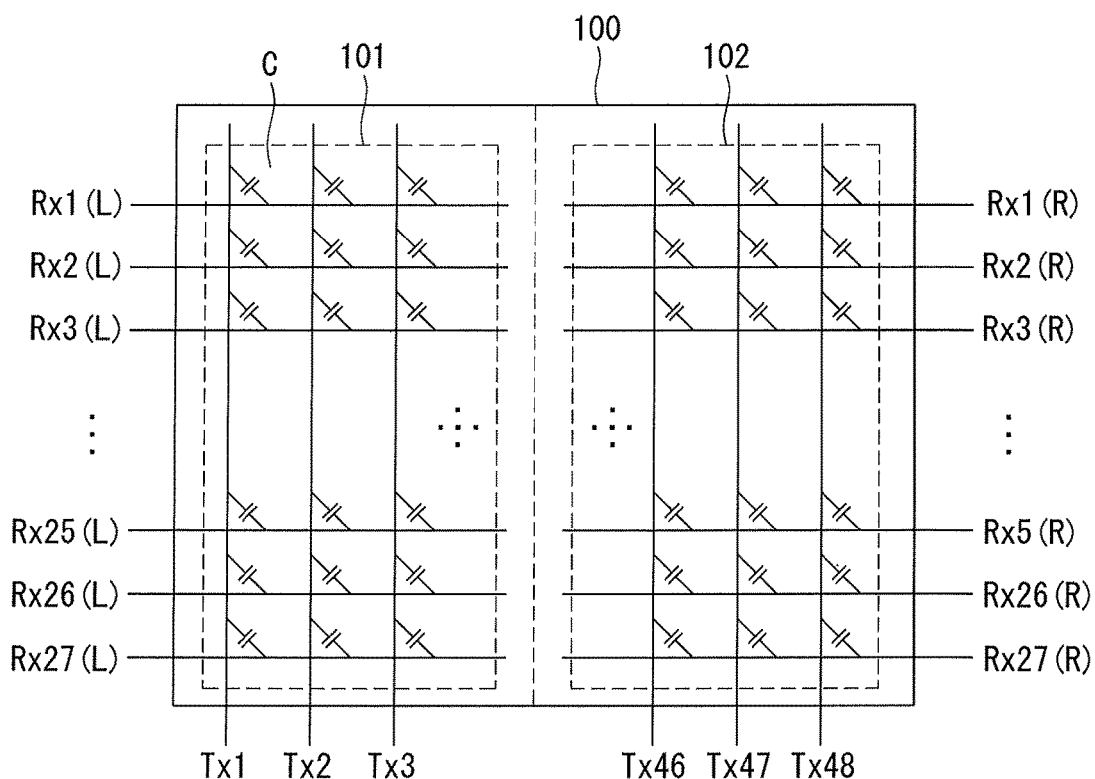
FIG. 2 is an equivalent circuit diagram showing mutual capacitance touch sensors.

Referring to FIGS. 1 and 2, a touch and gesture sensing system according to the present invention comprises a display panel 100 with touch and gesture sensors C embedded in it; and a touch and gesture sensor driving circuit 300 (hereinafter, "sensor driving circuit") for driving the touch and gesture sensors C.

A pixel array of the display panel 100 comprises pixels PIX defined by data lines D1 to Dm (m is a positive integer) and gate lines G1 to Gn (n is a positive integer). The pixels PIX may be implemented as pixels of an LCD of FIG. 4 or pixels of an OLED display of FIG. 5.

Figure 4:
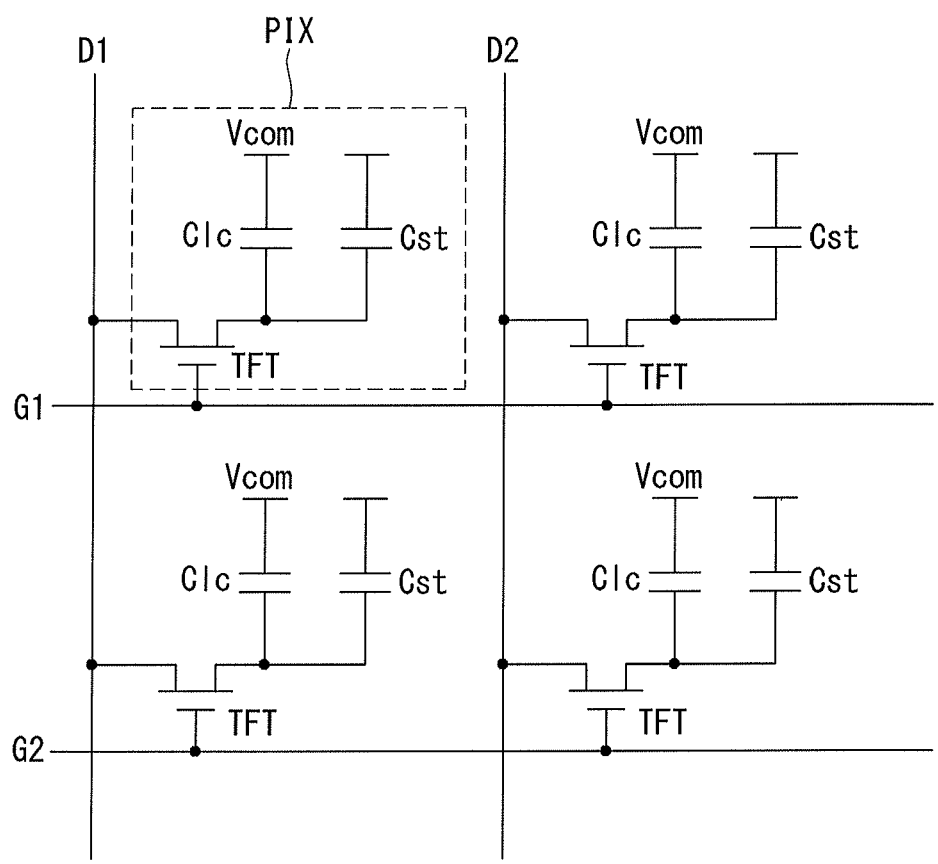
FIG. 4 is an equivalent circuit diagram showing pixels of an LCD.

As shown in FIG. 4, the pixels PIX of the LCD comprise TFTs (thin film transistors) formed at the crossings of the data lines D1 to Dm and the gate lines G1 to Gn, pixel electrodes to be charged with data voltages, common electrodes to be supplied with a common voltage Vcom, and storage capacitors Cst connected to the pixel electrodes to maintain the voltage of a liquid crystal cell.

Figure 5:
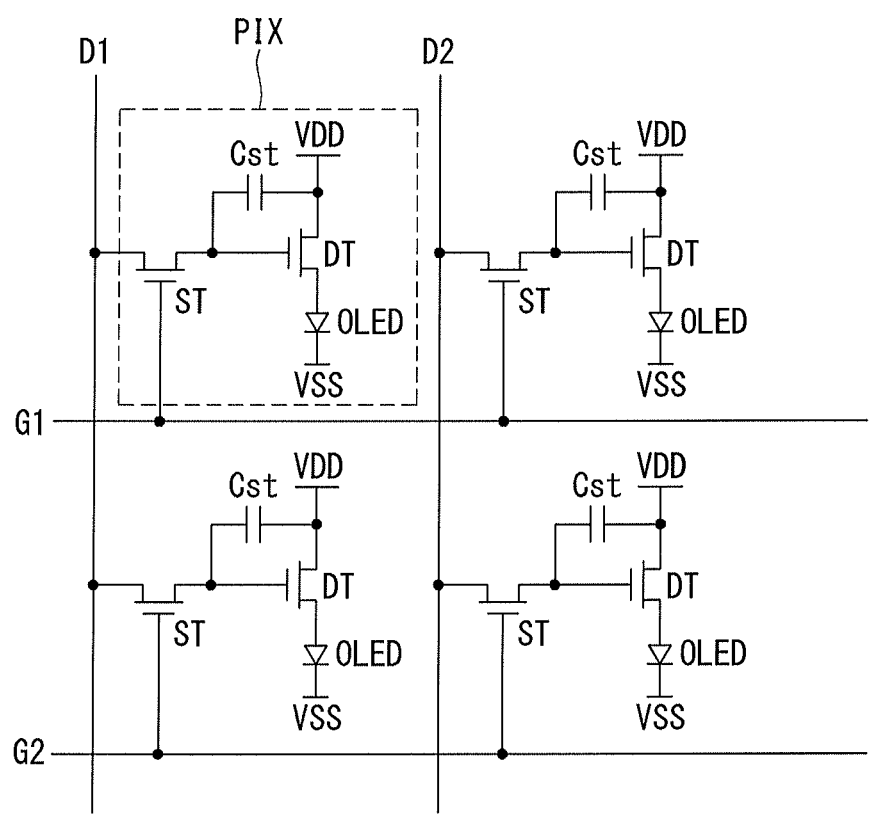
FIG. 5 is an equivalent circuit diagram showing pixels of an OLED display.

As shown in FIG. 5, the pixels PIX of the OLED comprise switching TFTs (ST), driving TFTs (DT) connected to the switching TFTs (ST), OLEDs and storage capacitors Cst connected to the driving TFTs (DT), and electrodes to be supplied with high and low potential pixel power voltages VDD and VSS. Each of the pixels PIX may further comprise a compensation circuit for sensing and compensating the threshold voltage and mobility of the driving TFT (DT).

The display panel 100 may further comprise color filters and a black matrix. In the LCD, a backlight unit may be placed below the back surface of the display panel 100.

The pixels PIX of the display panel 100 are driven by a display driving circuit. The display driving circuit writes input image data to the pixels PIX. The display driving circuit comprises a data driving circuit 202, a gate driving circuit (or scan driving circuit) 204, and a timing controller 206.

The data driving circuit 202 is driven during a display driving period to convert digital video data RGB received from the timing controller 206 into a gamma compensation voltage and output a data voltage. The data voltage output from the data driving circuit 202 is supplied to the pixels PIX through the data lines D1 to Dm. The gate driving circuit 204 is driven during the display driving period to sequentially supply a gate pulse (or scan pulse) synchronized with the data voltage and select a line of the display panel 100 to which the data voltage is written. The gate pulse swings between a gate high voltage VGH and a gate low voltage VGL.

Under the control of the timing controller 206, the data driving circuit 202 and the gate driving circuit 204 are driven to create input during the display driving period but do not create any new input during a touch sensor driving period and a gesture sensor driving period. The data driving circuit 202 maintains the data voltage output at the last point in time of the previous display driving period during the touch sensor driving period and the gesture sensor driving period, and keeps the voltage of the data lines constant. The gate driving circuit 202 does not generate any gate pulse and maintains the voltage of the gate lines at the gate low voltage VGL during the touch sensor driving period and the gesture sensor driving period.

The timing controller 206 transmits digital video data of an input image received from a host system to the data driving circuit 202. The timing controller 206 generates timing control signals for controlling operation timings of the data driving circuit 202 and gate driving circuit 204 by using input timing signals, such as a vertical synchronization signal Vsync, a horizontal synchronization signal Hsync, a data enable signal DE, and a main clock MCLK, received from a host system.

The timing controller 206 generates a synchronization signal Tsync for time-dividing 1 frame period into a display driving period, a touch sensor driving period, and a gesture sensing period. The sensor driving circuit 300 is synchronized with the display driving circuit in response to the synchronization signal Tsync from the timing controller 206.

The host system may be implemented as any one of the following: a television system, a set-top box, a navigation system, a DVD player, a Blu-ray player, a personal computer (PC), a home theater system, and a phone system. The host system includes a system on chip (SoC), in which a scaler is embedded, and thus converts digital video data of an input image into a data format suitable for displaying on the display panel 100. The host system transmits the digital video data RGB and the timing signals Vsync, Hsync, DE, and MCLK to the timing controller 206. Further, the host system runs an application associated with spatial coordinate information of touch input or gesture input received from the sensor driving circuit 300.

The pixel array comprises touch and gesture sensors C (hereinafter, "sensors"). Each of the sensors senses touch input and gesture input using a capacitive sensor. The touch input is positional input from an object touching the screen of the display panel. The gesture input is positional input from an object located in the space in front of the screen of the display panel without touching the screen.

Figure 3:
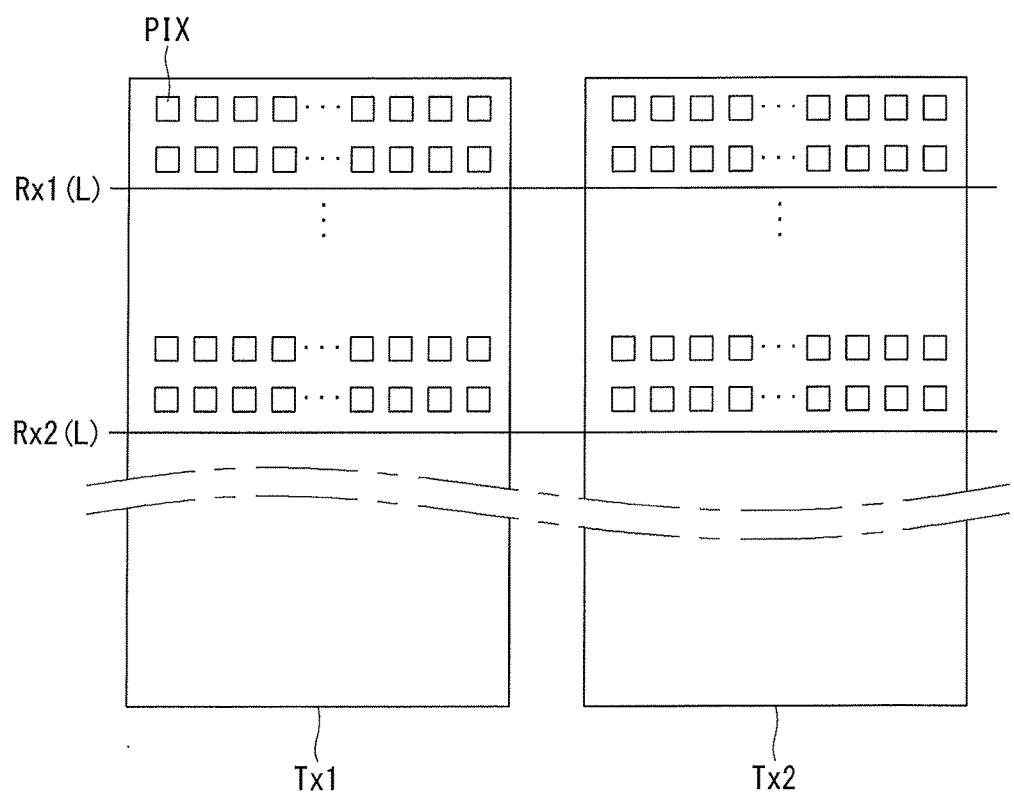
FIG. 3 is an enlarged top plan view showing part of Tx lines and Rx lines.

The sensor lines connected to the sensors C may be formed to share the electrodes of the pixel array. As shown in FIGS. 2 and 3, sensors lines connected to mutual capacitance sensors comprise Tx lines Tx1 to Tx48 and Rx lines Rx1(L) to Rx27(L) and Rx1(R) to Rx27(R) that are orthogonal to each other. Each of the Tx lines Tx1 to Tx48 and the Rx lines Rx1(L) to Rx27(L) and Rx1(R) to Rx27(R) is formed larger in size than the pixels PIX and connected to a plurality of pixels. The sensors C are formed at the crossings of the Tx lines Tx1 to Tx48 and Rx lines Rx1(L) to Rx27(L) and Rx1(R) to Rx27(R).

Figure 9:
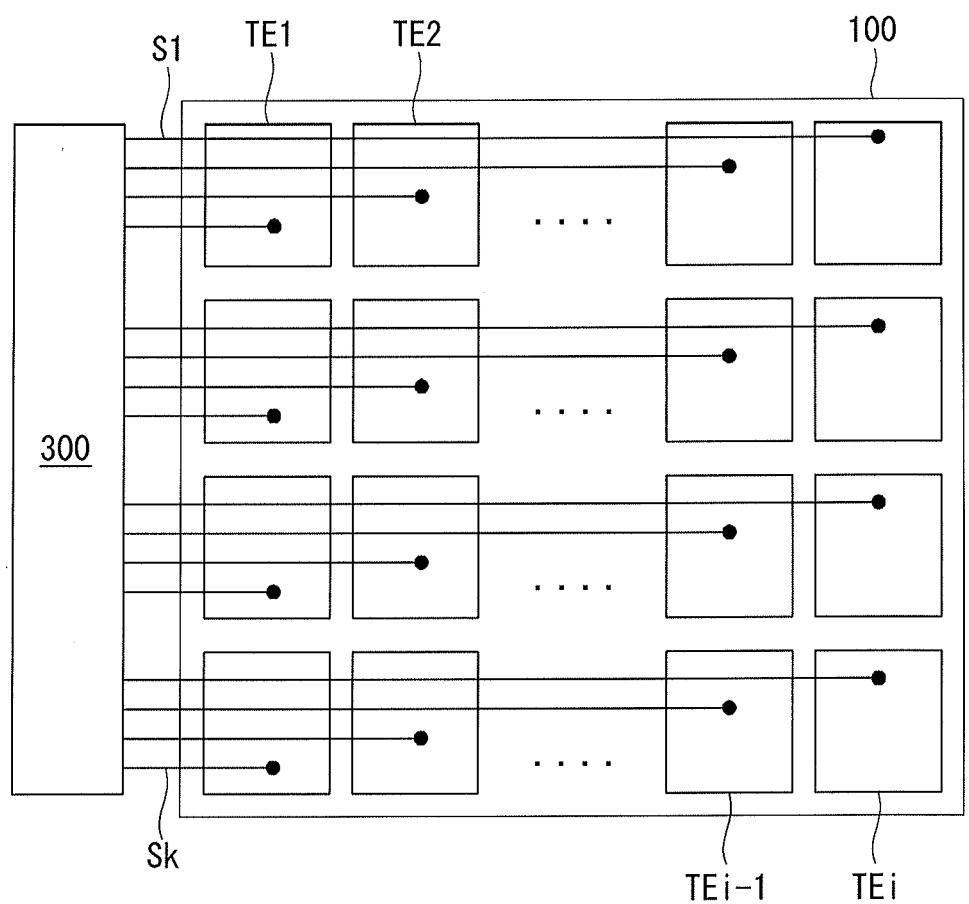
FIG. 9 is an equivalent circuit diagram showing self capacitance touch and gesture sensors.

As shown in FIG. 9, sensors lines connected to self capacitance sensors comprise sensor lines S1 to Sk connected to sensor electrodes TE1 to TEi on a one-to-one basis. The sensor electrodes TE1 to TEi are formed larger in size than the pixels PIX and connected to a plurality of pixels.

The sensor lines may be implemented in such a manner as to separate the common electrodes of the pixel array. The common electrodes are connected to a plurality of pixels PIX and supply the same voltage to the pixels. The common electrodes may be electrodes of the LCD of FIG. to which the common voltage Vcom is supplied, or electrodes of the OLED display of FIG. 5 to which high and low potential pixel power voltages VDD and VSS are supplied. Accordingly, the sensor lines function as the common electrodes of the pixels during the display driving period. The sensor lines function as touch sensor lines during the touch sensing period and gesture sensor lines during a gesture sensing period.

The sensor driving circuit 300 is driven during the touch sensor driving period defined by the synchronization signal Tsync, applies a touch sensor driving signal to the sensors C, and analyzes variations of the touch sensor driving signal by a preset touch recognition algorithm. If the amount of variation of the touch sensor driving signal received through a sensor is greater than or equal to a first threshold value, this means that the sensor has received touch input, and the coordinates of the touch input are calculated.

The sensor driving circuit 300 is driven during the gesture sensor driving period defined by the synchronization signal Tsync, applies a gesture sensor driving signal to the sensors C, and analyzes variations of the gesture sensor driving signal by a preset gesture recognition algorithm. If the amount of variation of the gesture sensor driving signal received through a sensor is greater than or equal to a second threshold value, this means that the sensor has received gesture input, and the coordinates of the gesture input are calculated. The first threshold value and the second threshold value may be the same or different from each other. The touch recognition algorithm and the gesture recognition algorithm are implemented as algorithms for recognizing touch input and gesture input by commonly using the capacitive sensors.

Figure 6:
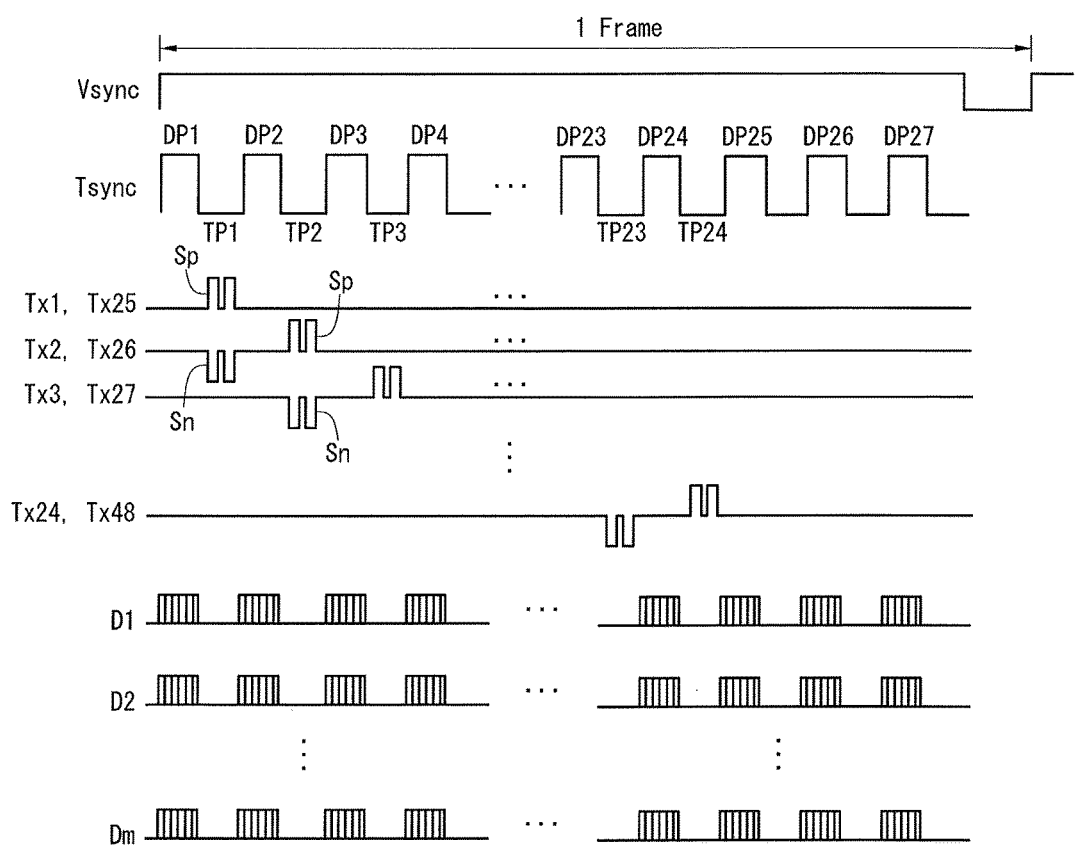
FIGS. 6 and 7 are waveform diagrams showing a driving method of a touch and gesture sensing system according to an exemplary embodiment of the present invention.
Figure 7:
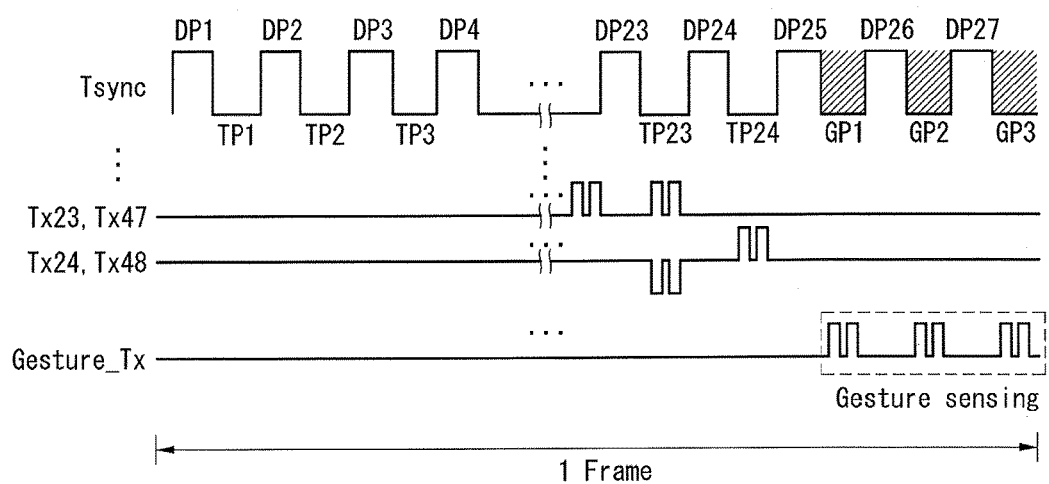

As shown in FIGS. 6 and 7, the sensor driving circuit 300 counts the number of first logic periods of a synchronization signal Tsync, and senses touch input during a touch sensing period corresponding to a predetermined number of first logic periods of each frame period. The sensor driving circuit 300 senses gesture input during a gesture sensing period corresponding to the remaining number of first logic periods. Although FIG. 6 illustrates that the first logic periods of the synchronization signal Tsync are at low logic level, the present invention is not limited to this example.

In the example of FIGS. 6 and 7, the touch sensing period is divided into 24 periods TP1 to TP24 and the gesture sensing period is divided into three periods GP1 to GP3, but the present invention is not limited to this example. All of the sensors C forming the touch screen are driven in a time-division manner in the touch sensing periods TP1 to TP24, and driven in a time-division manner in the gesture sensing periods GP1 to GP3.

The display driving period is defined by a second logic period of the synchronization signal Tsync. The timing controller 206 disables the sensor driving circuit 300 during the display driving period, and enables the sensor driving circuit 300 during the touch sensing period and the gesture sensing period.

The display driving period is divided by the touch sensing periods TP1 to TP24 and the gesture sensing periods GP1 to GP3. In the example of FIGS. 6 and 7, the display driving period is divided into, but not limited to, 27 pixel driving periods DP1 to DP27, which are divided by the touch sensing periods TP1 to TP24 and the gesture sensing periods GP1 to GP3. The pixels of the pixel array are driven in a time-division manner in the 27 pixel driving periods DP1 to DP27.

1 frame period has an idle period equal to the difference in length between the pixel driving periods and the touch sensing periods. In the present invention, the idle period is used as the gesture sensing period.

The number of pixel driving periods DP1 to DP27 is greater than the number of touch sensing periods TP1 to TP24. An equal number of pixel driving periods DP1 to DP24 and touch sensing periods TP1 to TP24 are arranged in an alternating manner. The remaining number of pixel driving periods DP25 to DP27 and the gesture sensing periods GP1 to GP3 are arranged in an alternating manner.

Enlarging the screen of the display panel 100 causes load increase due to increased line length and increased capacitance, and this may result in a longer delay in the transmission of a touch sensor driving signal and a gesture sensor driving signal. In the present invention, the touch screen can be driven in a division manner as shown in FIG. 2, in order to reduce load and sensor driving time.

Referring to FIGS. 2, 6, and 7, the sensor lines may be divided into a first area 101 and a second area 102.

The sensor lines comprise Tx lines Tx1 to Tx24 of a first group formed in the first area 101, Rx lines Rx1(L) to Rx27(L) of the first group formed in the first area 101, Tx lines Tx25 to Tx48 of a second group formed in the second area 102, and Rx lines Rx1(R) to Rx27(R) of the second group formed in the second area 102. The Rx lines Rx1(L) to Rx27(L) of the first group and the Rx lines Rx1(R) to Rx27(R) of the second group are separated at the boundary between the first area 101 and the second area 102.

A Tx line formed in the first area 101 and a Tx line formed in the second area 102 are driven in pairs during the touch sensing period. For example, a first Tx line pair comprises a first Tx line Tx1 formed in the first area 101 and a 25th Tx line Tx25 formed in the second area 102. A second Tx line pair comprises a second Tx line Tx2 formed in the first area 101 and a 26th Tx line Tx26.

During the touch sensing period, the sensor driving circuit 300 applies the touch sensor driving signal simultaneously to the first Tx line pair Tx1 and Tx25 and then applies it simultaneously to the second Tx line pair Tx2 and Tx26. In this way, the sensor driving circuit 300 sequentially applies the touch sensor driving signal to the Tx lines Tx1 to Tx48 in pairs during the touch sensing period. Accordingly, the present invention can reduce sensing time to ½ or less, compared to the prior art using the same number of Tx channels, by simultaneously applying the touch sensor driving signal to the Tx lines in pairs.

The sensor driving circuit 300 may generate touch sensor driving signals applied to neighboring Tx lines as opposite phase driving signals synchronized with each other. The opposite phase driving signals may comprise a positive polarity signal Sp having a potential higher than the reference potential and a negative polarity signal Sn synchronized with the positive polarity signal Sp. The positive polarity signal Sp is applied to an Nth Tx line pair (N is a positive integer), and the negative polarity signal Sn is applied to an (N+1)th Tx line pair. The opposite phase driving signals were proposed in U.S. Patent Publcation No. 2013-0076675A1 (2013. Mar. 28.). The opposite phase driving signals can further reduce noise from the sensors, compared to a conventional single polarity signal.

The sensor driving circuit 300 receives sensor signals through the Rx lines Rx1(L) to Rx27(L) and Rx1(R) to Rx27(R) in synchronization with a touch sensor driving signal.

The sensor driving circuit 300 applies a gesture sensor driving signal to the sensors C during the gesture sensing period. The electric field of the gesture sensor driving signal is formed higher, above the screen, than that of the touch sensor driving signal. The sensor driving circuit 300 applies the gesture sensor driving signal to the sensor lines Tx1 to TX48, Rx1(L) and Rx27(R), and Rx1(R) to Rx27(R) in a different way than it applies the touch sensor driving signal.

The gesture sensor driving signal may swing at the same voltage as the touch sensor driving signal. The gesture sensor driving signal is applied to sensor lines spaced apart at wider intervals than in the touch sensing method or sensor lines orthogonal to each other. The gesture sensor driving signal may be generated at a higher voltage than the touch sensor driving signal. Moreover, the gesture sensor driving signal may be generated as a multi-step waveform signal which increases the initial voltage. The gesture sensor driving signal may be applied simultaneously to N sensor lines at a time by means of a multiplexer 316 shown in FIG. 8. When the gesture sensor driving signal is applied simultaneously to all the sensor lines, two types of gestures can be recognized. Once the gesture sensor driving signal is simultaneously applied to all of the sensor lines, the sensors may recognize an object over the display panel or not, although the size of the object or the direction of motion of the object is not detected. These two types of gesture sensing will be enough for simple switching between functions such as power on/off.

Figure 8:
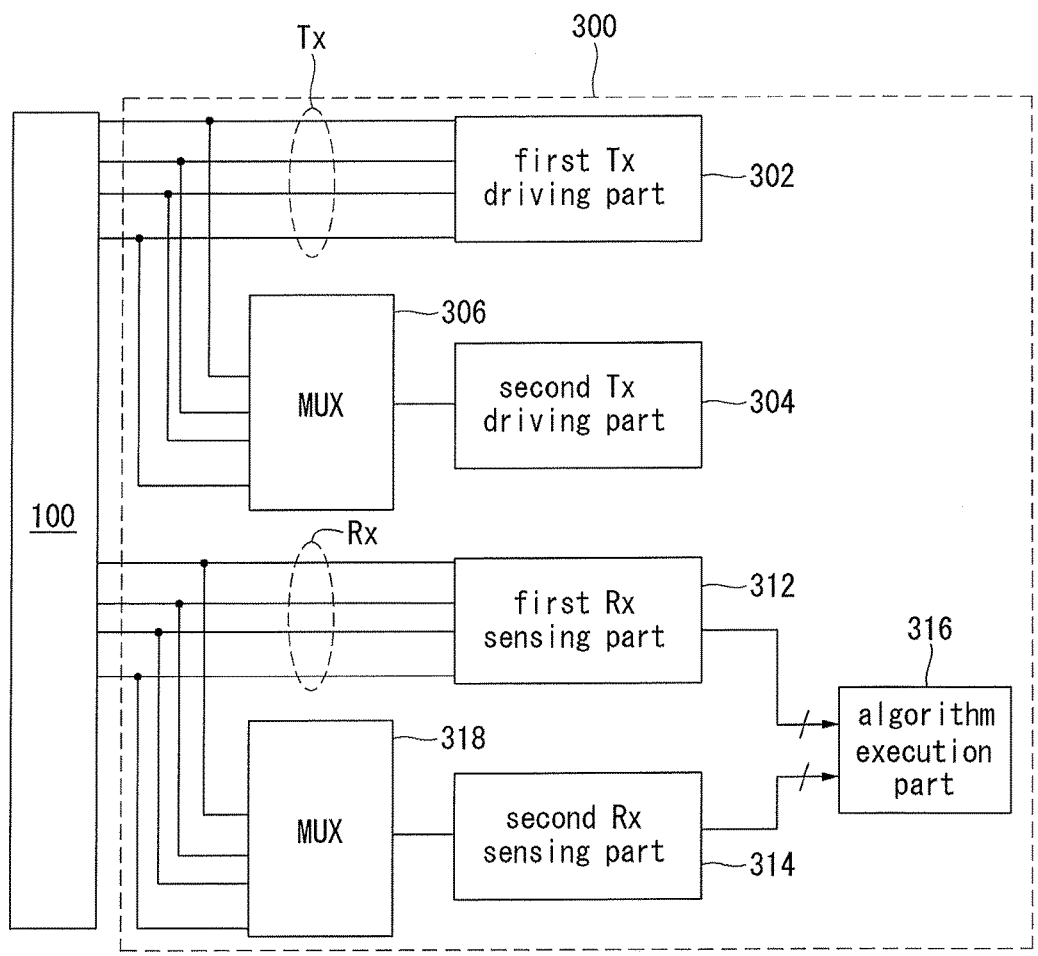
FIG. 8 is a block diagram showing a touch and gesture sensor driving circuit according to a first exemplary embodiment of the present invention.

FIG. 8 is a block diagram showing the sensor driving circuit 300 according to a first exemplary embodiment of the present invention. The sensor driving circuit 300 of FIG. 8 can drive mutual capacitance sensors.

Referring to FIG. 8, the sensor driving circuit 300 comprises a touch sensing part, a gesture sensing part, and an algorithm execution part 316.

The touch sensing part senses touch input during the touch sensing period. The touch sensing part comprises a first Tx driving part 302 and a first Rx sensing part 312.

The first Tx driving part 302 applies a touch sensor driving signal to Tx lines Tx1 to Tx48, i.e., some of the sensor lines, during the touch sensing period. The first Rx sensing part 312 converts sensor signals received through the Rx lines Rx1(L) to Rx27(L) and Rx1(R) to Rx27(R) in synchronization with the touch sensor driving signal into digital data by means an analog-to-digital converter (hereinafter, "ADC"), and transmits the digital data to the algorithm execution part 316. A signal received from a sensor C is varied before and after touch input. The algorithm execution part 316 executes a touch recognition algorithm to compare the digital data received from the first Rx sensing part 312 with a first threshold value and determine that a sensor C has received a touch input signal if the amount of variation of the touch sensor driving signal received through the sensor C is large. Next, the algorithm execution part 316 calculates the coordinates of the touch input and transmits them to a host system. The algorithm execution part 316 may be implemented as an MCU (micro controller unit).

The gesture sensing part senses gesture input during the gesture sensing period. The gesture sensing part comprises a second Tx driving part 304 and a second Rx sensing part 314.

A gesture sensor driving signal is applied to some sensor lines through predetermined Tx channels. The Tx channels through which the gesture sensor driving signal is transmitted may be connected to Tx lines and/or Rx lines. Accordingly, the gesture sensor driving signal may be applied to Rx lines, as well as Tx lines to which the touch sensor driving signal is applied.

The second Tx driving part 304 applies the gesture sensor driving signal to selected sensor lines through Tx channels during the gesture sensor driving period. The second Rx sensing part 314 converts a sensor signal received in synchronization with the gesture sensor driving signal into digital data by ADC and transmits it to the algorithm execution part 316. The algorithm execution part 316 executes a gesture recognition algorithm to compare the digital data received from the second Rx sensing part 314 with a second threshold value and determine that a sensor C has received a gesture input signal if the amount of variation of the gesture sensor driving signal received through the sensor C is large. Next, the algorithm execution part 316 calculates the coordinates of the gesture input and transmits them to a host system.

In FIG. 8, a first multiplexer 306 distributes the gesture sensor driving signal simultaneously to a plurality of sensor lines. A second multiplexer 318 transmits sensor signals received from the plurality of sensor lines to the second Rx sensing part 314 through the same channel. The first multiplexer 306 and the second multiplexer 316 may be omitted according to gesture sensing methods.

Figure 10:
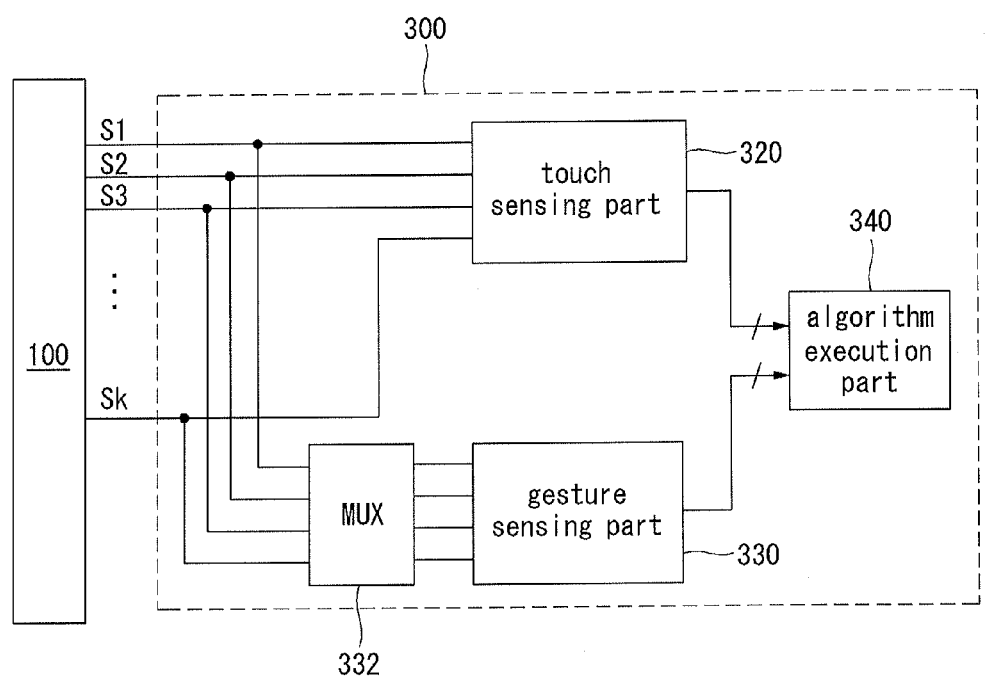
FIG. 10 is a block diagram showing a touch and gesture sensor driving circuit according to a second exemplary embodiment of the present invention.

FIG. 9 is an equivalent circuit diagram showing self capacitance touch and gesture sensors. FIG. 10 is a block diagram showing the sensor driving circuit 300 according to a second exemplary embodiment of the present invention. The sensor driving circuit of FIG. 10 can drive self capacitance sensors.

Referring to FIGS. 9 and 10, sensor electrodes TE1 to TEi are connected to sensor lines S1 to Sk of the display panel 100.

The sensor lines S1 to Sk comprise the sensor lines S1 to Sk connected to the sensor electrodes TE1 to TEi on a one-to-one basis. As described above, the sensor electrodes TE1 to TEi may be implemented by dividing the common electrodes of the pixel array. Accordingly, the sensor lines function as the common electrodes of the pixels during the display driving period. The sensor lines function as touch sensor lines during the touch sensing period and gesture sensor lines during a gesture sensing period.

The sensor driving circuit 300 comprises a touch sensing part 320, a gesture sensing part 330, and an algorithm execution part 340.

The touch sensing part 320 applies a touch sensor driving signal to the sensor lines S1 to Sk during the touch sensing period, and converts the signal received through the sensor lines S1 to Sk into digital data and transmits it to the algorithm execution part 340. The algorithm execution part 340 executes a touch recognition algorithm to compare the digital data received from the touch sensing part 320 with a first threshold value and determine that a sensor C has received a touch input signal if the amount of variation of the touch sensor driving signal received through the sensor C is large. Next, the algorithm execution part 340 calculates the coordinates of the touch input and transmits them to a host system. The algorithm execution part 340 may be implemented as an MCU.

The gesture sensing part 330 applies a gesture sensor driving signal to selected sensor lines through Tx channels during the gesture sensor driving period. The gesture sensing part 330 converts a sensor signal received in synchronization with the gesture sensor driving signal into digital data by ADC and transmits it to the algorithm execution part 340. The algorithm execution part 340 executes a gesture recognition algorithm to compare the digital data received from the gesture sensing part 330 with a second threshold value and determine that a sensor C has received a gesture input signal if the amount of variation of the gesture sensor driving signal received through the sensor C is large. Next, the algorithm execution part 340 calculates the coordinates of the gesture input and transmits them to a host system.

In FIG. 10, a multiplexer 332 distributes the gesture sensor driving signal to sensor lines, and adjusts the number of channels through which sensor signals are transmitted from the sensor lines S1 to Si to the gesture sensing part 330. The multiplexer 332 may be omitted according to gesture sensing methods.

The touch sensing par 320 may comprise a multiplexer (not shown). Since the multiplexer distributes a touch sensor driving signal output from the touch sensing part 320 to a plurality of sensor lines, the number of channels of the touch sensing part 320 can be reduced to be smaller than the number of sensor lines S1 to Si.

As described above, the present invention can secure a sufficient gesture sensing period by allocating in the remaining part of 1 frame period, except the display driving period and touch sensing period, as the gesture sensing period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch and gesture sensing system comprising:
   a display panel comprising a pixel array, sensors, and sensor lines connected to the sensors;
   a display driving circuit that writes a data voltage to the pixels of the pixel array during a display driving period; and
   a sensor driving circuit that applies a touch sensor driving signal to the sensors to sense touch input during a touch sensing period and applies a gesture sensor driving signal to the sensors to sense gesture input during a gesture sensing period,
   wherein the display driving period is divided into a plurality of pixel driving periods, the touch sensing period is divided into a plurality of touch sensing periods, and a number of pixel driving periods is greater than a number of touch sensing periods; and
   wherein an equal number of pixel driving periods and touch sensing periods are arranged in an alternating manner, the gesture sensing period is divided into a plurality of gesture sensing periods, and a remaining number of pixel driving periods and the gesture sensing periods of the plurality of gesture sensing periods are arranged in an alternating manner.

2. The touch and gesture sensing system of claim 1, wherein the sensors are mutual capacitance sensors that are formed at crossings of the sensor lines.

3. The touch and gesture sensing system of claim 2, wherein the sensor lines comprise:
   Tx lines of a first group formed in a first area of the pixel array;
   Rx lines of the first group formed in the first area;
   Tx lines of a second group formed in a second area of the pixel array; and
   Rx lines of the second group formed in the second area,
   wherein the Rx lines of the first group and the Rx lines of the second group are separated at a boundary between the first area and the second area.

4. The touch and gesture sensing system of claim 3, wherein the sensor driving circuit applies the touch sensor driving signal simultaneously to a Tx line pair comprising a Tx line formed in the first area and a Tx line formed in the second area during the touch sensing period, and receives signals from the sensors through the Rx lines of the first and second groups in synchronization with the touch sensor driving signal.

5. The touch and gesture sensing system of claim 1, wherein the sensors are self capacitance sensors that are connected to the sensor lines formed along one direction on a one-to-one basis.

6. A driving method of a touch and gesture sensing system, the method comprising:
   writing a data voltage to pixels of a pixel array during a display driving period;
   applying a touch sensor driving signal to sensors to sense touch input during a touch sensing period; and
   applying a gesture sensor driving signal to the sensors to sense gesture input during a gesture sensing period,
   wherein the display driving period is divided into a plurality of pixel driving periods, the touch sensing period is divided into a plurality of touch sensing periods, and a number of pixel driving periods is greater than a number of touch sensing periods; and
   wherein an equal number of pixel driving periods and touch sensing periods are arranged in an alternating manner, the gesture sensing period is divided into a plurality of gesture sensing periods, and a remaining number of pixel driving periods and the gesture sensing periods of the plurality of gesture sensing periods are arranged in an alternating manner.

7. The method of claim 6, wherein the sensors are mutual capacitance sensors that are formed at crossings of sensor lines.

8. The method of claim 6, wherein sensor lines comprise:
   Tx lines of a first group formed in a first area of pixel array;
   Rx lines of the first group formed in the first area;
   Tx lines of a second group formed in a second area of the pixel array; and
   Rx lines of the second group formed in the second area,
   wherein the Rx lines of the first group and the Rx lines of the second group are separated at boundary between the first area and the second area.

9. The method of claim 7, wherein the sensor driving circuit applies the touch sensor driving signal simultaneously to a Tx line pair comprising a Tx line formed in a first area and a Tx line formed in a second area during the touch sensing period, and receives signals from the sensors through Rx lines of first and second groups of sensor lines in synchronization with the touch sensor driving signal.

10. The method of claim 6, wherein the sensors are self capacitance sensors that are connected to sensor lines formed along one direction on a one-to-one basis.

11. A driving device for sensing touch and gesture comprising a pixel array, sensors, and sensor lines connected to the sensors, comprising:
    a display driving circuit that writes a data voltage to the pixels of the pixel array during a display driving period; and
    a sensor driving circuit that applies a touch sensor driving signal to the sensors to sense touch input during a touch sensing period and applies a gesture sensor driving signal to the sensors to sense gesture input during a gesture sensing period,
    wherein the display driving period is divided into a plurality of pixel driving periods, the touch sensing period is divided into a plurality of touch sensing periods, and a number of pixel driving periods is greater than a number of touch sensing periods; and
    wherein an equal number of pixel driving periods and touch sensing periods are arranged in an alternating manner, the gesture sensing period is divided into a plurality of gesture sensing periods, and a remaining number of pixel driving periods and the gesture sensing periods of the plurality of gesture sensing periods are arranged in an alternating manner.

12. The driving device of claim 11, wherein the sensors are mutual capacitance sensors that are formed at crossings of sensor lines.

13. The driving device of claim 12, wherein the sensor lines comprise:
    Tx lines of a first group formed in a first area of the pixel array;

Rx lines of the first group formed in the first area;
Tx lines of a second group formed in a second area of the pixel array; and
Rx lines of the second group formed in the second area,
wherein the Rx lines of the first group and the Rx lines of the second group are separated at a boundary between the first area and the second area.

14. The driving device of claim 13, wherein the sensor driving circuit applies the touch sensor driving signal simultaneously to a Tx line pair comprising a Tx line formed in the first area and a Tx line formed in the second area during the touch sensing period, and receives signals from the sensors through the Rx lines of the first and second groups in synchronization with the touch sensor driving signal.

15. The driving device of claim 11, wherein the sensors are self capacitance sensors that are connected to the sensor lines formed along one direction on a one-to-one basis.

\* \* \* \* \*